Aug. 7, 1934.　　　　J. M. PESTARINI　　　1,969,699
CONTROL OF DIRECT CURRENT FOR MOTORS
Filed Aug. 27, 1932
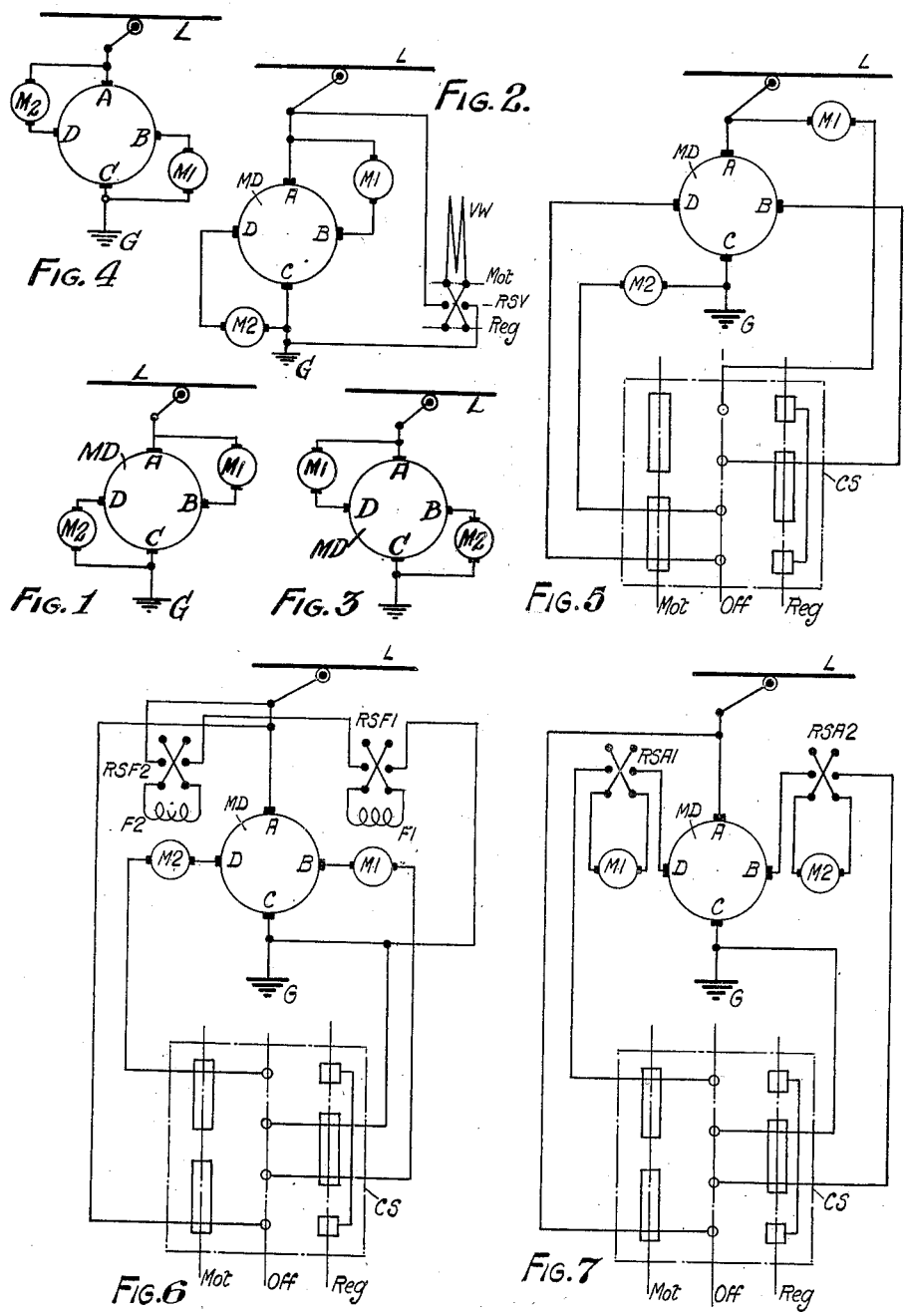
INVENTOR
Joseph M. Pestarini
By
ATTORNEY Patented Aug. 7, 1934

1,969,699

UNITED STATES PATENT OFFICE 1,969,699

CONTROL OF DIRECT CURRENT FOR MOTORS

Joseph Maxime Pestarini, Paris, France

Application August 27, 1932, Serial No. 630,715
In France November 16, 1931

3 Claims. (Cl. 172—179)

This invention relates to the control of direct current electric motors.

Various methods have been adopted for controlling the excitation of direct current motors when the starting period is over and the motors are working directly on the line voltage and it is desired to reduce the motor field in order to maintain the torque or tractive effort as high as possible. In the case of the ordinary series-wound motor the field reduction may be effected by connecting shunting resistances or diverters in parallel with the field windings, whereas with compound-wound motors resistances may be inserted in series with the separately excited field windings. The strength of the field is controlled by the operator who cuts in and out the diverters or resistances, and in order to avoid the necessity for skill on the part of the operator the cutting in and out of the diverters or resistances may be effected by means of current relays actuated in accordance with the armature current flowing through the motors. Experience has shown, however, that such automatic relays frequently operate incorrectly, for example due to shocks and jolts of the vehicle, and in consequence violent surges may occur resulting in heavy currents being drawn from the line. Sudden variations of load will also increase the tendency for the wheels to skid on the rails. Furthermore the maintenance of a constant average current independent of field variations has two drawbacks, namely, first it renders commutation more difficult as the field decreases and involves the danger of a flashover at the commutator when the field is at a minimum, and second it strains the motor because of the excessive armature copper losses compared with the small torque developed as a result of the field reduction.

Referring to the accompanying drawing:

Fig. 1 is a schematic diagram showing two motors connected to a metadyne in the figure 8 connection when receiving current from a source of supply through said metadyne;

Fig. 2 is a schematic diagram showing motors connected to a metadyne in figure 8 connection illustrating a control equipment by which the motors may be caused to receive current from the metadyne or to act regeneratively through returning current to the line;

Fig. 3 is a diagram similar to Fig. 1 showing the motors connected for regenerative operation and returning current to the source of supply through the metadyne;

Fig. 4 is a diagram similar to Fig. 3 showing a modified arrangement of connections of the motors for regeneration;

Fig. 5 is a diagram showing a control equipment whereby the connection of the motors may be changed from those shown in Fig. 1 to those shown in Fig. 3; and Figs. 6 and 7 are diagrams showing different control equipments whereby the connections of the motors may be changed from those shown in Fig. 1 to those shown in Fig. 4.

The arrangements shown in the drawing are very suitable for use when current is supplied to a plurality of electric motors through the machine known and hereinafter referred to as a metadyne. The metadyne is a rotary direct current transformer which transforms a fixed voltage and variable amperes supplied to it into constant amperes at variable voltage, and is thus an extremely convenient apparatus for use during the starting period of electric motors as by its means a particularly smooth acceleration is obtained, and furthermore the transfer from the starting period into the ordinary motoring period is very smooth and easy.

The metadyne equipment can also be employed during the period when the counter-electromotive force of the motors is equal to or greater than the line voltage, and during either motoring, when the motors are overcoming resistance to traction, for example in an electric traction equipment, or during regeneration, when the motors are returning current to the line.

The present invention relates to a special arrangement for controlling motors operated through a metadyne apparatus when regenerating.

The metadyne comprises a rotary armature with a commutator somewhat similar to a direct current armature and is provided with four brushes arranged to make contact with the commutator at the respective extremities of the two diameters. Two brushes at opposite ends of a diameter, termed primary brushes, are connected to the supply terminals, line and ground for example, and the other two brushes, termed secondary brushes, are connected through two motors respectively to the other brushes. The arrangement will be clearly understood from the diagram Fig. 1 of the drawing and is commonly known as the figure 8 connection.

In the drawing the metadyne armature is marked MD and the motor armatures M1, M2 respectively. The metadyne brushes are marked A, B, C, D in succession round the commutator, the brush A being connected to the line L and C being connected to ground G. The field windings of the motors are not shown.

With this connection at the beginning of the starting period the potentials of the brushes B and D are equal to the potentials of the brushes A and C respectively apart from the drops in voltage due to ohmic resistance, which need not be considered. When the motors have started and increase in speed the potentials of B and D will gradually change, that of B will decrease and that of D will increase until finally the potential of the brush B becomes equal to that of the brush C, which is ground potential, and the potential of brush D becomes equal to that of the brush A, which is the voltage of the line. At this time, therefore, the motors may be connected direct between line and ground, as their counter-electromotive force equals the line voltage.

When regenerating, if the same direction of current through the metadyne, which is usually considered as flowing from brush B to brush D, is to be maintained, then as the current through the armature of motor M1 is flowing upwards, i.e. from brush B back to the line, the potential of the brush B must be greater than the potential of the brush A. Brush A, however, is connected to the line and has therefore line voltage. Consequently during regeneration under these conditions the potential of brush B must be higher than the line voltage. Similarly the potential of the brush D must be lower than that of the brush C, that is to say the brush D must have a negative potential which must be lower than that of the ground. The metadyne must therefore be designed so as to generate in the segments CB and DA electromotive forces somewhat higher than the line voltage, and consequently the apparatus must be larger than would be necessitated if motoring connections only are required.

According to the invention two arrangements are provided which render regeneration possible without the necessity of generating in the metadyne electromotive forces superior to the line voltage. The first arrangement consists in providing for reversing of the direction of the secondary current, which is originally assumed to flow from the brush B to the brush D through the metadyne by forcing such current to flow from the brush D to the brush B. Referring to Fig. 2 the metadyne is provided with a stator winding marked VW, commonly known as a variator winding, by which when energized magnetic fluxes are induced in the rotor, the direction of the resultant of which is in the line of the brushes B, D. The motors M1 and M2 are provided with field windings F1 and F2 which are connected between line and ground for example. The variator winding VW is also connected across the line and is provided with a reversing switch RSV having two positions indicated by dotted lines marked "Mot." and "Reg." by which its connections to the line circuit can be reversed. The reversing switch is indicated in the usual conventional manner. The stator winding VW is mounted on the polar segments of the metadyne stator in a well known manner, the stator being omitted for the sake of clearness in the drawing. If the reversing switch RSV is turned to the position "Mot." the direction of current in the variator winding VW will be such as to cause current to be supplied from the metadyne to the motors. If, however, the reversing switch RSV is turned to the position marked "Reg." so that the direction of current in the variator winding VW is reversed the direction of flow of current through the metadyne will be reversed and the motors M1, M2 will then be caused to act regeneratively and return current to the line. This reversal of the direction of flow of current through the metadyne can be obtained through the action of a stator winding, the ampere turns of which are arranged to give a flux through the metadyne armature in the same direction as the ampere turns of the secondary current flowing in the metadyne armature from B to D. However with this arrangement the metadyne will be mainly excited by the stator winding and the secondary rotor ampere turns will compensate for a portion of the over excitation from the stator so that the resulting ampere turns will be just sufficient for generating between the brushes A and C an electromotive force equal to the line voltage, neglecting, of course, the voltage drops due to ohmic resistance. Thus owing to the copper losses in the stator the dimensions will necessarily require to be larger than in the case of a metadyne which is used in the motoring position only and not in regeneration.

The second arrangement according to the invention avoids the objection which is above indicated and consists in maintaining the original direction of the secondary current flowing from B to D through the metadyne, which is done by reversing the figure 8 connection formed by the motors and the metadyne. This may be effected in two ways. In the first method the motor M1 is connected between the brushes A and D instead of between the brushes A and B and motor M2 is connected between the brushes B and C instead of between the brushes D and C. This reversal of connection is shown in Fig. 3 of the drawing. In other words, the connections of the motors M1 and M2 to the brushes B and D are interchanged. In Fig. 5 a schematic diagram of a simple control arrangement is shown embodying a hand operated control switch CS of the drum type adapted to be rotated to occupy three positions indicated by the dotted lines "Off", "Mot." and "Reg.". With this arrangement it will be readily seen that with the switch CS occupying the "Off" position the motors are disconnected from the metadyne, but when the switch is turned to the position marked "Mot." the motors will be connected in accordance with the diagram Fig. 1 in which case they will be supplied with current from the metadyne and act as motors, whereas if the switch CS be turned to the position "Reg." the motors will be connected to the metadyne in accordance with the arrangements shown in Fig. 3 and will operate regeneratively. It will be observed that with this arrangement the direction of current through the motors will be reversed when regenerating and it will not be necessary to reverse the connections of the field windings. The second method is shown in Fig. 4, in which motor M1 is connected between brushes B and C and motor M2 is connected between brushes D and A. This corresponds to an interchange of the connections of the respective motors to the brushes A and C.

A control equipment for this method is shown schematically in Fig. 6 and with this arrangement if the control switch CS is moved to the position "Mot." the motors will be connected in accordance with the diagram Fig. 1 and will receive current from the metadyne, but if the switch CS is turned to the position "Reg." the motors will be connected to the metadyne in accordance with the diagram Fig. 4 and will act regeneratively to return current to the line. In this case the direction of current flowing in the motors when regenerating will not be reversed and it will consequently be necessary to reverse the connections of their respective field windings F1 and F2 by means of the reversing switches RSF1 and RSF2 in the usual way.

In Fig. 7 a control equipment similar to that described with reference to Fig. 6 is shown schematically but in place of providing reversing switches for the field windings of the motors, reversing switches indicated in the usual conventional manner at RSA1 and RSA2 by which the armature terminal of the motors can be reversed when the motors are operating regeneratively.

I claim:—

1. The combination with a metadyne transformer supplied with primary current through two primary brush sets from a source of substantially constant voltage and at least two electric motors connected in a figure 8 connection between the primary and secondary brushes, a stator winding on the metadyne for inducing a magnetic flux in the metadyne rotor substantially in the direction of the secondary brush sets, of means for reversing the direction of the current through said stator winding to cause the motors to operate regeneratively and return current through the metadyne transformer to the source of primary current.

2. The combination with a metadyne transformer supplied with primary current through two primary brush sets from a source of substantially constant voltage and at least two electric motors connected in a figure 8 connection between the primary and secondary brush sets, of means for interchanging the connections of the motors to the two secondary brush sets of the metadyne transformer to cause the motors to operate regeneratively, without altering the direction of the secondary current in the metadyne.

3. The combination with a metadyne transformer supplied with primary current through two primary brush sets from a source of substantially constant voltage and at least two electric motors connected in a figure 8 connection between the primary and secondary brush sets, of means for interchanging the connections of the motors to the two primary brush sets to cause the motors to operate regeneratively without altering the direction of secondary current in the metadyne.

JOSEPH MAXIME PESTARINI.